US010578723B2

(12) United States Patent  
Iwazawa

(10) Patent No.: US 10,578,723 B2  
(45) Date of Patent: Mar. 3, 2020

(54) POSITION DETECTOR

(71) Applicant: OKUMA Corporation, Niwa-gun, Aichi (JP)

(72) Inventor: Katsutoshi Iwazawa, Niwa-gun (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 330 days.

(21) Appl. No.: 15/621,228

(22) Filed: Jun. 13, 2017

(65) Prior Publication Data

US 2017/0356986 A1 Dec. 14, 2017

(30) Foreign Application Priority Data

Jun. 14, 2016 (JP) ................... 2016-118031

(51) Int. Cl.
| | |
|---|---|
| *G01S 7/491* | (2006.01) |
| *G01S 7/4915* | (2020.01) |
| *G01D 5/12* | (2006.01) |
| *G01S 17/06* | (2006.01) |

(52) U.S. Cl.  
CPC .............. *G01S 7/4915* (2013.01); *G01D 5/12* (2013.01); *G01S 17/06* (2013.01)

(58) Field of Classification Search  
None  
See application file for complete search history.

(56) References Cited

U.S. PATENT DOCUMENTS

| | | | | |
|---|---|---|---|---|
| 5,541,784 A | * | 7/1996 | Cribbs ............... | G11B 5/59633 360/75 |
| 2003/0001564 A1 | * | 1/2003 | Hayashi ............. | G01D 5/24409 324/207.12 |
| 2008/0228423 A1 | * | 9/2008 | Hayashi ............. | G01D 5/24409 702/94 |
| 2010/0195563 A1 | * | 8/2010 | Jong .................. | H04B 7/18513 370/321 |
| 2010/0202079 A1 | * | 8/2010 | Buch ...................... | B82Y 10/00 360/51 |
| 2014/0238136 A1 | * | 8/2014 | Ten Grotenhuis ......................... | G01N 29/0654 73/592 |
| 2018/0094924 A1 | * | 4/2018 | Horiguchi ............ | G01B 21/045 |

FOREIGN PATENT DOCUMENTS

JP          2008232649 A          10/2008

* cited by examiner

*Primary Examiner* — Tung S Lau  
(74) *Attorney, Agent, or Firm* — Cantor Colburn LLP

(57) ABSTRACT

In a position detector for converting, into position information, two signals shifted in phase by 90 degrees from each other, a phase correction value calculator for calculating a phase correction value for correcting a phase difference between the two signals calculates a phase change value representing a change in the phase correction value, to find a next phase correction value based on the phase change value and a present phase correction value. A virtual change value calculator calculates, based on second-order components obtained by Fourier analysis of a radius value, a virtual phase change value representing another change in the phase correction value obtained when changes in offset and amplitude ratio are ignored, and a virtual amplitude change value representing a change rate in an amplitude ratio correction value obtained when a change in the phase difference is ignored.

4 Claims, 3 Drawing Sheets

POSITION DETECTOR

CROSS REFERENCE TO RELATED APPLICATION

The present invention claims priority under 35 U.S.C. § 119 to Japanese Application No. 2016-118031 filed on Jun. 14, 2016 including the specification, claims, drawings, and abstract is incorporated herein by reference in its entirety.

TECHNICAL FIELD

This specification discloses a position detector for converting, into position information, output signals from position sensors for respectively outputting signals that change relative to a measured displacement at a pitch of a wavelength λ in the shape of sine waves whose phases are shifted from each other by 90 degrees.

BACKGROUND ART

A conventional technique described in JP 2008-232649 A will be briefly described below with reference to FIG. 5. A cosine wave signal SC detected by a position sensor 24 is amplified in an amplifier 3 and output as a numerical value AC. Further, a sine wave signal SS detected by a position sensor 25 is amplified in an amplifier 4 and output as a numerical value AS. The amplified numerical values AC and AS are digitized in AD converters 6 and 7 at a sampling interval indicated by a timing signal TIM, which is output from a timing controller 5, and output as numerical values DC and DS, respectively. In an ideal state, the numerical values DC and DS can be expressed by the following Equations 1 and 2:

$$DC = G \times \cos(360) \qquad \text{Equation 1}$$

$$DS = G \times \sin(360) \qquad \text{Equation 2}$$

In fact, however, the two digitized numerical values DC and DS include offset values COF and SOF, a phase difference P between the two signals, and an amplitude ratio B of the two signals resulting from installation errors of the position sensors, variations in characteristics of the amplifiers 3 and 4, and other factors. For this reason, following Equations 3 and 4 can be used to precisely express the numerical values DC and DS, respectively.

$$DC = G \times \cos(360) + COF \qquad \text{Equation 3}$$

$$DS = B \times G \times \sin(360) + P \cdot G \cdot \cos(360) + SOF \qquad \text{Equation 4}$$

Here, the offset values COF and SOF, the value P indicative of the phase difference, and the value B indicative of the amplitude ratio are slightly changed depending on measurement positions. With this in view, correction values for eliminating the offset values COF, SOF, a phase error, and an amplitude ratio error are constantly calculated in JP 2008-232649 A, to correct for the numerical values DC and DS based on the calculated correction values.

Specifically, a storage 30 stores a cosine offset correction value CO which is a numerical value used for eliminating an offset component (COF) contained in the numerical value DC. A subtractor 8 subtracts the cosine offset correction value CO stored in the storage 30 from the digitized numerical value DC to obtain a numerical value DCA, and outputs the obtained value DCA.

In addition, a storage 31 stores a sine offset correction value SO which is a numerical value used for eliminating an offset component (SOF) contained in the numerical value DS. A subtractor 9 subtracts the sine offset correction value SO stored in the storage 31 from the digitized numerical value DS to obtain a numerical value DSA, and outputs the obtained value DSA.

A storage 32 stores a phase correction value PJ which is a numerical value used for calculating a phase difference (P) contained in the numerical value DSA. A multiplier 15 multiplies the numerical value DCA by the phase correction value PJ, and a subtractor 14 subtracts the multiplied value output from the multiplier 15 from the numerical value DSA to obtain a numerical value DSB.

A storage 33 stores an amplitude ratio correction value BJ which is a numerical value used for correcting for the amplitude ratio (B) contained in the numerical value DSB. A multiplier 16 multiplies the numerical value DSB by the amplitude ratio correction value BJ to calculate a numerical value DSC.

The above-described operations produce numerical values DCA and DSC in which the offset, the phase difference, and the amplitude ratio are corrected. The numerical values DCA and DSC are input into a radius calculator 18 and an interpolation calculator 17. The radius calculator 18 outputs a radius value RD obtained by calculation using the numerical values DCA and DSC in accordance with Equation 5.

$$RD = \sqrt{DCA^2 + DSC^2} \qquad \text{Equation 5}$$

The interpolation calculator 17 performs an arctangent calculation using the numerical values DCA and DSC to calculate an interpolation position IP (i.e. position information). Here, a counter value obtained by count processing based on changes in the signal SC and the signal SS, the interpolation position IP, and other values may be used to calculate positions separated by a pitch smaller than the pitch of the wavelength λ, which is beyond the purpose of explanation of the present invention, and is therefore not described further.

In a fast Fourier calculator 19, a change in the radius value RD relative to the interpolation position IP is analyzed by Fourier analysis. More specifically, the fast Fourier calculator 19 performs averaging and interpolation processing to obtain a value corresponding to the radius value RD for each positional change by $\lambda/2^N$ of the interpolation position IP, and calculates the first- to third-order components of an amount of change in the radius value RD through Fourier analysis. Further, the fast Fourier calculator 19 calculates an average radius value RDA from $2^N$ radius values RDs.

Here, the cosine component and sine component of the wavelength λ, which are the first-order components obtained by the Fourier calculation, are defined as numerical values C1 and S1; the cosine component and sine component of a wavelength λ/2, which are the second-order components, are defined as numerical values C2 and S2; and the cosine component and sine component of a wavelength λ/3, which are the third-order components, are defined as numerical values C3 and S3.

A calculator 36 adds the cosine component C1 of the wavelength λ being the first-order component calculated in the fast Fourier calculator 19 to a present cosine offset correction value CO stored in the storage 30, and subtracts from the added result the cosine component C3 of the wavelength λ/3 being the third-order component to calculate the numerical value COA. The calculated numerical value COA is stored as a next cosine offset correction value CO in the storage 30.

A calculator 37 adds both the sine component S1 of the wavelength λ being the first-order component calculated in the fast Fourier calculator 19 and the sine component S3 of the wavelength λ/3 being the third-order component calculated in the fast Fourier calculator 19 to a present sine offset correction value SO stored in the storage 31 to calculate a numerical value SOA. The calculated numerical value SOA is stored as a next sine offset correction value SO in the storage 31.

A calculator 35 uses the numerical value S2 which is the sine component of the wavelength λ/2 calculated in the fast Fourier calculator 19 and the numerical value RDA of the average radius for calculation of below-described Equation 6, to find and output a numerical value DP.

$$DP=2\times S2/RDA \qquad \text{Equation 6}$$

A subtractor 38 subtracts the numerical value DP calculated in the calculator 35 from the present phase correction value PJ stored in the storage 32 to calculate the numerical value PJA which is stored as a next phase correction value PJ in the storage 32.

A calculator 34 uses the numerical value C2 which is the cosine component of the wavelength λ/2 calculated in the fast Fourier calculator 19 and the numerical value RDA of the average radius for calculation of below-described Equation 7, to find and output a numerical value DB.

$$DB=(RDA+C2)/(RDA-C2) \qquad \text{Equation 7}$$

A multiplier 39 multiplies a present amplitude ratio correction value BJ stored in the storage 33 by the numerical value DB calculated in the calculator 34 to calculate a numerical value BJA which is stored as a next amplitude ratio correction value BJ in the storage 33.

In the conventional technique, the offset, phase difference, and amplitude ratio are slightly changed depending on positions, and such slight changes are determined through the above-described calculations, to improve accuracy in interpolation by means of the determined changes.

Meanwhile, in JP 2008-232649 A, the offset, the phase difference, and the amplitude ratio that depend on positions are calculated based on the numerical values obtained by applying Fourier analysis to the square root of the sum of squares of two signals (DCA and DSC) having a wavelength λ in a pitch period (i.e. the radius value RD), to realize high accuracy in interpolation using the calculated results. In a position detector of JP 2008-232649 A, however, when a difference between the present and next offset correction values or a difference between the present and next amplitude ratio correction values becomes significant due to a greater change in the offset or the amplitude ratio, an error will be introduced into the phase correction value. Further, when a difference between the present and next phase correction values becomes significant due to a greater change in the phase difference, an error will be introduced into the amplitude ratio correction value that is to be updated.

In other words, in the conventional technique, when the position sensor exhibits a wide range of variations in the offset, the phase difference, and the amplitude ratio, responsiveness of correction values to be updated is deteriorated. The deteriorated responsiveness has contributed a hindrance to achieving improvement in interpolation accuracy.

SUMMARY

This specification discloses a position detector for converting, into position information, two signals output from position sensors, the two signals which sinusoidally change at a pitch of a wavelength λ relative to a measured displacement and have phases that are shifted by 90 degrees from each other. The position detector disclosed in this specification includes a storage that stores offset correction values respectively used for correcting offset amounts contained in the two signals, a phase correction value used for correcting a phase difference between the two signals, and an amplitude ratio correction value used for correcting an amplitude ratio between the two signals, an offset eliminator that eliminates each of the offset amounts from the corresponding one of the two signals based on corresponding one of the offset correction values, a phase error eliminator that eliminates a phase error component from one of the two signals based on the phase correction value, an amplitude ratio error eliminator that eliminates an amplitude ratio error component from the one of the two signals based on the amplitude ratio correction value, an interpolation calculator that converts into position information the two signals obtained after elimination of the offset amounts, the phase error component, and the amplitude ratio error component, a radius calculator that calculates a square root of the sum of squares of the two signals obtained after elimination of the offset amounts, the phase error component, and the amplitude ratio error component and outputs the calculated square root as a radius value, a Fourier calculator that analyzes a change in the radius value relative to the position information through Fourier analysis, an offset correction value calculator that calculates, based on an analyzed result in the Fourier calculator, offset change values respectively representing amounts of change in the offset correction values, to find each next offset correction value based on both the corresponding one of the calculated offset change value and the corresponding one of present offset correction values, a phase correction value calculator that calculates a phase change value representing an amount of change in the phase correction value, to find a next phase correction value based on both the calculated phase change value and a present phase correction value, an amplitude ratio correction value calculator that calculates an amplitude ratio change value representing a ratio of change in the amplitude ratio correction value to find a next amplitude ratio correction value based on both the calculated amplitude ratio change value and a present amplitude ratio correction value, and a virtual change value calculator that calculates, based on second-order components obtained through the Fourier analysis, both a virtual phase change value representing another amount of change in the phase correction value obtained when changes in the offset amounts and a change in the amplitude ratio are ignored and a virtual amplitude ratio change value representing another ratio of change in the amplitude ratio correction value obtained when a change in the phase difference is ignored. In the position detector, the phase correction value calculator calculates the phase change value based on the offset change values, the radius value, the virtual phase change value, and the virtual amplitude ratio change value.

This specification discloses another position detector for converting, into position information, two signals output from position sensors, the two signals sinusoidally changing at a pitch of a wavelength λ relative to a measured displacement and having phases that are shifted by 90 degrees from each other. The position detector disclosed in this specification includes a storage that stores offset correction values respectively used for correcting offset amounts contained in the two signals, a phase correction value used for correcting a phase difference between the two signals, and an amplitude ratio correction value used for correcting an amplitude ratio between the two signals, an offset eliminator that eliminates each of the offset amounts from the corresponding one of the two signals based on the corresponding one of the offset correction values, a phase error eliminator that eliminates a phase error component from one of the two signals based on the phase correction value, an amplitude ratio error eliminator that eliminates an amplitude ratio error component from the one of the two signals based on the amplitude ratio correction value, an interpolation calculator that converts into position information the two signals obtained after elimination of the offset amounts, the phase error component, and the amplitude ratio error component, a radius calculator that calculates a square root of the sum of squares of the two signals obtained after elimination of the offset amount, the phase error component, and the amplitude ratio error component and outputs the calculates square root as a radius value, a Fourier calculator that analyzes a change in the radius value relative to the position information through Fourier analysis, an offset correction value calculator that calculates, based on an analyzed result in the Fourier calculator, offset change values respectively representing amounts of change in the offset correction values, to find each next offset correction value based on both the corresponding one of the offset change values and the corresponding one of present offset correction values, a phase correction value calculator that calculates a phase change value representing an amount of change in the phase correction value, to find a next phase correction value based on both the calculated phase change value and a present phase correction value, an amplitude ratio correction value calculator that calculates an amplitude ratio change value representing a ratio of change in the amplitude ratio correction value to find a next amplitude ratio correction value based on both the calculated amplitude ratio change value and a present amplitude ratio correction value, and a virtual change value calculator that calculates, based on second-order components obtained through the Fourier analysis and the radius value, both a virtual phase change value representing another amount of change in the phase correction value obtained when changes in the offset amounts and a change in the amplitude ratio are ignored and a virtual amplitude ratio change value representing another ratio of change in the amplitude ratio correction value obtained when a change in the phase difference is ignored. In the position detector, the amplitude ratio correction value calculator calculates the amplitude ratio change value based on the virtual phase change value and the virtual amplitude ratio change value.

According to the position detector disclosed in this specification, an error in the phase correction value and an error in the amplitude ratio correction value can be corrected, thereby contributing to further improved accuracy of interpolation.

BRIEF DESCRIPTION OF DRAWINGS

An embodiment of the present disclosure will be described by reference to the following figures, wherein.

DESCRIPTION OF THE EMBODIMENT

Figure 1:
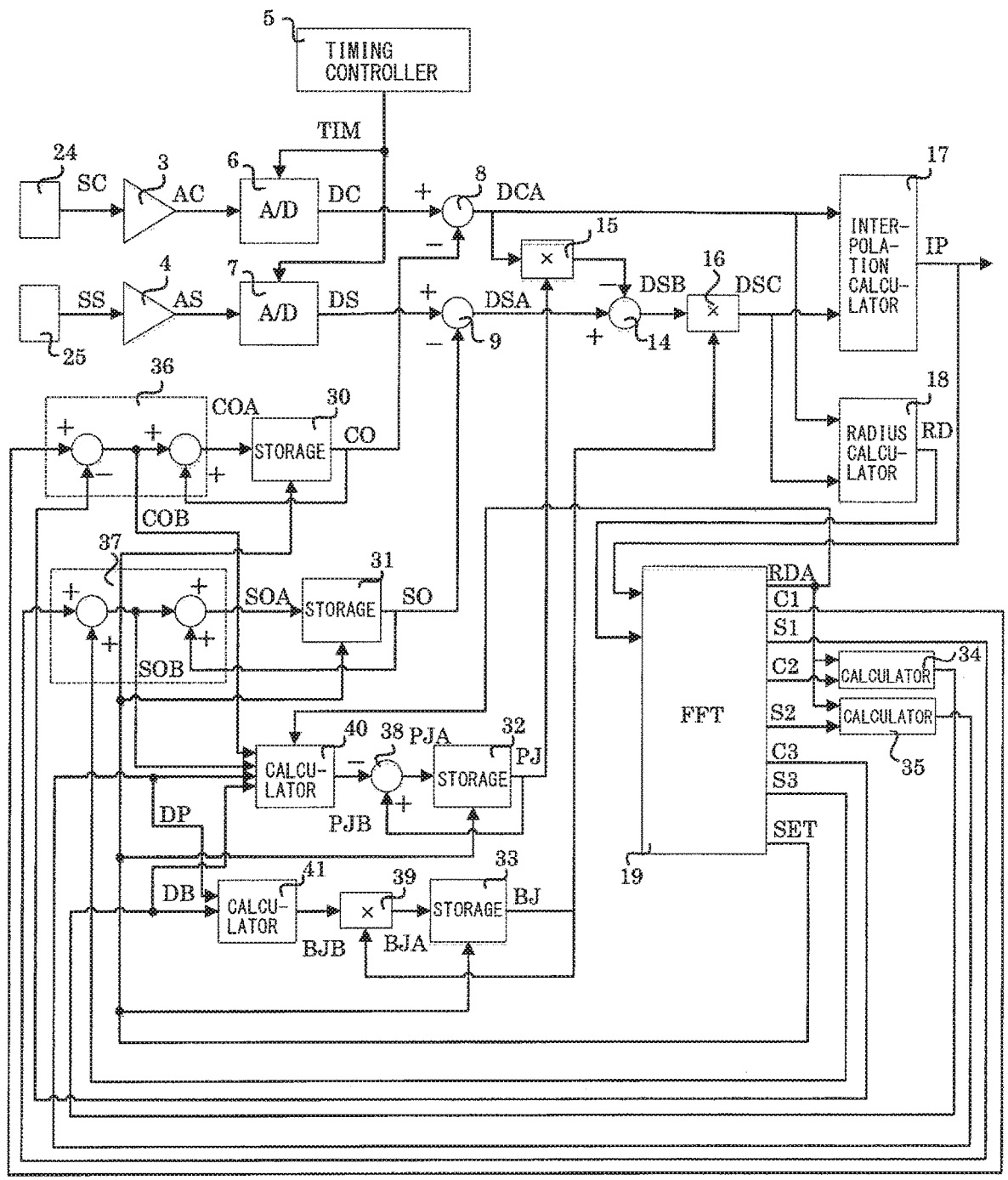
FIG. 1 shows a configuration of a position detector.
Figure 5:
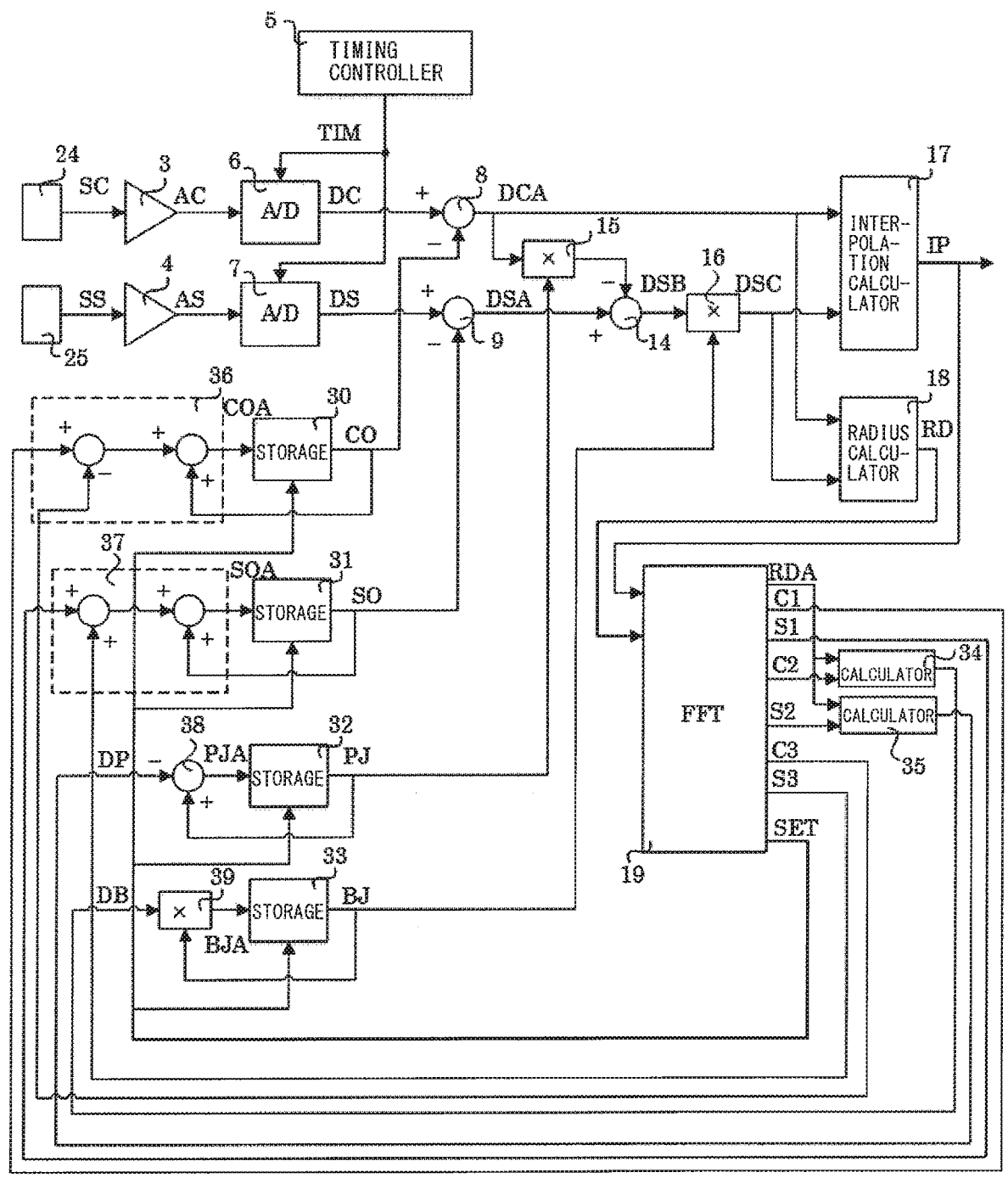
FIG. 5 is a diagram showing a configuration of a conventional position detector.

Hereinafter, an example of the configuration of a position detector is described with reference to FIG. 1. In FIG. 1, which is almost identical to FIG. 5 showing a conventional technique, components similar to those in the conventional technique are identified by identical reference numerals to those in FIG. 5, and the descriptions related to the components will not be repeated. As is evident from the explanation of the conventional technique, a storage 30, a storage 31, a storage 32, and a storage 33 in this example function as storage units for storing offset correction values CO and SO, a phase correction value PJ, and an amplitude ratio correction value BJ, respectively. The four storages may be composed of separate storage devices (such as, for example, memories), or may be composed of a single storage device. Further, subtractors 8 and 9 respectively function as offset eliminators for eliminating an offset amount from each of two signals DC and DS. Still further, a multiplier 15 and a subtractor 14 cooperatively function as a phase error eliminator for eliminating a phase error component from the signal DS. In addition, a multiplier 16 functions as an amplitude ratio error eliminator for eliminating an amplitude ratio error component from the signal DS.

A fast Fourier calculator 19 receives as inputs a radius value RD output from a radius calculator 18 and an interpolation position IP output from an interpolation calculator 17. The fast Fourier calculator 19 analyzes a change in the radius value RD relative to the interpolation position IP as in the case of the conventional technique. More specifically, the fast Fourier calculator 19 performs averaging and interpolation processing to find a value corresponding to the radius value RD for each position change by $\lambda/2^N$ of the interpolation position IP, and calculates first- to third-order components of an amount of change in the radius value RD by means of Fourier calculation. Then, the fast Fourier calculator 19 calculates an average radius value RDA from $2^N$ radius values RDs.

The cosine and sine components of a wavelength $\lambda$, which are the first-order components obtained in the Fourier calculation, the cosine and sine components of a wavelength $\lambda/2$, which are the second-order components obtained in the Fourier calculation, and the cosine and sine components of a wavelength $\lambda/3$, which are the third-order components obtained in the Fourier calculation, are defined, in that order, as numerical values C1 and S1, numerical values C2 and S2, and numerical values C3 and S3.

A calculator 34 outputs, as described in connection with the conventional technique, a numerical value DB calculated in accordance with Equation 7 using the numerical value C2 which is the cosine component of the wavelength $\lambda/2$ and the numerical value RDA which is the average radius. In the conventional technique, the numerical value DB is multiplied by a present amplitude ratio correction value BJ to calculate a next amplitude ratio correction value BJ (=BJA). In this technique, however, a greater error will be introduced when a phase difference is greatly changed. Conversely, no error is introduced even when the next value BJA is calculated as BJA=DB×BJ, as long as the phase difference is not changed. From this, the numerical value DB can be regarded as a ratio of change in the amplitude ratio correction value BJ in a condition where the phase difference is unchanged. With this in view, the numerical value DB is hereinafter referred to as a "virtual amplitude ratio change value DB."

A calculator 35 outputs a numerical value DP calculated in accordance with Equation 6 using the numerical value S2 which is the sine component of the wavelength $\lambda/2$ and the numerical value RDA of the average radius. In the conventional technique, the numerical value DP is subtracted from a present phase correction value PJ, and the subtracted value is defined as a next phase correction value PJ (=PJA). In this technique, however, a greater error will be introduced when the offset amount and the amplitude ratio are greatly changed. Conversely, no error is introduced even when the next value PJA is calculated as PJA =PJ−DP, as long as the offset amount and the amplitude ratio are not changed. From this, the numerical value DP can be regarded as an amount of change in the phase correction value PJ in a condition where the offset amount and the amplitude ratio are unchanged. With this in view, the numerical value DP is hereinafter referred to as a "virtual phase change value DP." In this case, the calculators 34 and 35 function as virtual change value calculators for calculating the virtual change values DB and DP based on the second-order components obtained by Fourier analysis of the change in the radius value RD relative to the interpolation position IP.

A calculator 36 subtracts the third-order cosine component C3 from the first-order cosine component C1 to obtain a numerical value COB, and adds a present cosine offset correction value CO to the obtained numerical value COB to calculate a numerical value COA. The calculated numerical value COA is stored as a next cosine offset correction value CO in the storage 30. Here, because the numerical value COB represents an amount of change between the present cosine offset correction value CO and the next cosine offset correction value CO (=COA), the numerical value COB is hereinafter referred to as a "cosine offset change value COB."

A calculator 37 subtracts the third-order sine component S3 from the first-order sine component S1 to obtain a numerical value SOB, and adds a present sine offset correction value SO to the obtained numerical value SOB to calculate a numerical value SOA. The calculated numerical value SOA is stored as a next sine offset correction value SO in the storage 31. Here, because the numerical value SOB represents an amount of change between the present sine offset correction value SO and the next sine offset correction value SO (=SOA), the numerical value SOB is hereinafter referred to as a "sine offset change value SOB." It should be noted that the calculators 36 and 37 function as offset correction value calculators for calculating the next offset correction value based on the offset change value and the present offset correction value.

A calculator 40 receives the cosine offset change value COB calculated in the calculator 36, the sine offset change value SOB calculated in the calculator 37, the virtual amplitude ratio change value DB calculated in the calculator 34, the virtual phase change value DP calculated in the calculator 35, and the average radius value RDA. The calculator 40 outputs a numerical value PJB calculated using the received numerical values in the following Equation 8.

$$PJB = DP/DB + (COB \times SOB)/RDA \qquad \text{Equation 8}$$

The numerical value PJB functions as a phase change value representing the amount of change in the phase correction value PJ. A subtractor 38 subtracts the phase change value PJB calculated in the calculator 40 from the present phase correction value PJ stored in the storage 32 to obtain a numerical value PJA. The numerical value PJA obtained in the subtractor 38 is stored as the next phase correction value PJ in the storage 32.

A calculator 41 receives the virtual phase change value DP calculated in the calculator 35 and the virtual amplitude ratio change value DB calculated in the calculator 34. The calculator 41 outputs a numerical value BJB calculated using the received values in accordance with following Equation 9.

$$BJB = DP^2 + DB \qquad \text{Equation 9}$$

The numerical value BJB works as an amplitude ratio change value representing the ratio of change in the amplitude ratio correction value BJ. A multiplier 39 multiplies the amplitude ratio change value BJB calculated in the calculator 41 by the present amplitude ratio change value BJ stored in the storage 33 to calculate a numerical value BJA. The numerical value BJA calculated in the calculator 39 is stored as the next amplitude ratio correction value BJ in the storage 33.

Figure 2:
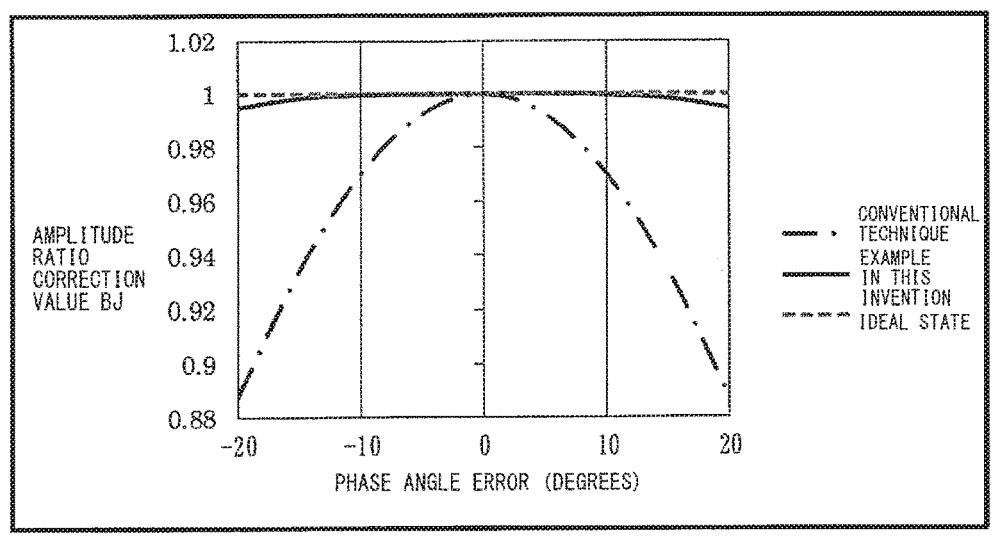
FIG. 2 is a graph showing a simulation result of an amplitude ratio correction value.

Next, referring to FIGS. 2 to 4, advantageous effects of the present invention will be described. FIG. 2 is a graph showing the amplitude ratio correction values BJs, each of which is obtained by one correction operation computed while changing a phase angle error under conditions that initial offset values contained in a sine-wave signal and a cosine-wave signal are fixed to 1.53% of the amplitudes and that the amplitude ratio of the sine-wave signal to the cosine-wave signal is fixed to 1. Further, in FIG. 2, the horizontal axis represents the phase angle errors (in the unit of degrees), and the vertical axis represents the amplitude ratio correction values BJs. Still further, in FIG. 2, a solid line represents the amplitude ratio correction values BJs obtained with the configuration of this example, a broken line represents an ideal amplitude ratio correction value, and a dot and dash line represents amplitude ratio correction values obtained in accordance with the conventional technique illustrated in FIG. 5. Because the amplitude ratio is fixed as described above to 1 in the operation of FIG. 2, the ideal amplitude ratio correction value is 1 as indicated by the broken line. However, in the conventional technique (shown by the dot and dash line), it can be seen from FIG. 2 that deviations of the amplitude ratio correction values from the ideal value (the broken line) become greater as the phase angle errors are increased. On the other hand, as is evident from FIG. 2, while deviations of the amplitude ratio correction values from the ideal value are gradually increased as the phase angle errors are increased in this example (solid line), the deviations are dramatically reduced from those in the conventional technique.

Figure 3:
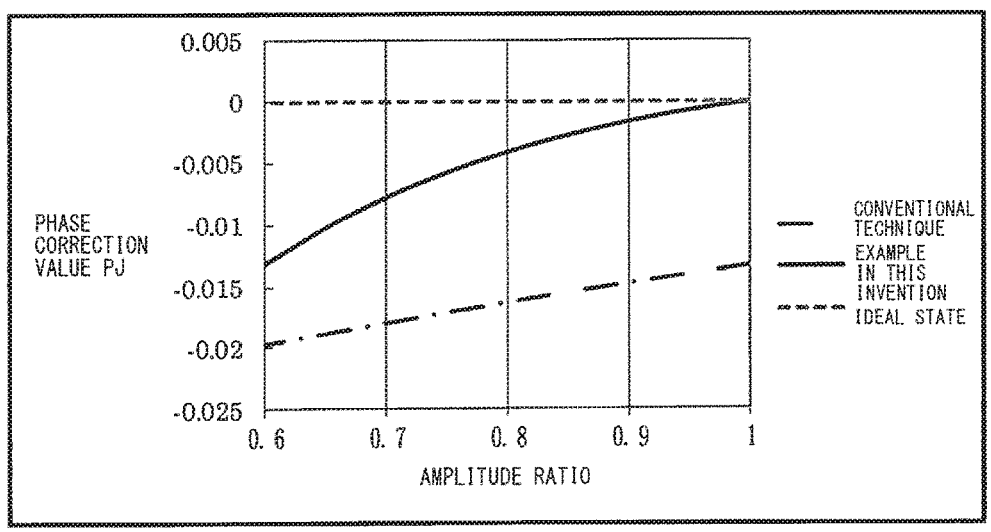
FIG. 3 is a graph showing a simulation result of a phase correction value.

FIG. 3 is a graph showing the phase correction values PJs, each of which is obtained by one correction operation computed while changing the amplitude ratio under conditions that the initial offset values contained in the sine-wave signal and the cosine-wave signal are fixed to 1.53% of the amplitudes and that the phase angle errors are fixed to 0 degrees. In FIG. 3, the horizontal axis represents the amplitude ratios of the sine-wave signal SS to the cosine-wave signal SC, and the vertical axis represents the phase correction values. Further, in FIG. 3, the solid line indicates the phase correction values PJs obtained with the configuration of this example, the broken line indicates a desirable ideal phase correction value, and the dot and dash line indicates the phase correction values obtained with the conventional technique illustrated in FIG. 5. Because the phase angle errors are fixed, as described above, to 0 degrees in the operation illustrated in FIG. 3, the desirable ideal phase correction value is 0. In the conventional technique (the dot and dash line), however, as is evident from FIG. 3, deviations of the phase correction values from the ideal value (broken line) become greater as the amplitude ratios are decreased from 1. On the other hand, it can be seen that deviations of the phase correction values from the ideal value are dramatically reduced as compared with the conventional technique, and the deviation from the ideal value is decreased to almost zero when the amplitude ratio is 1.

Figure 4:
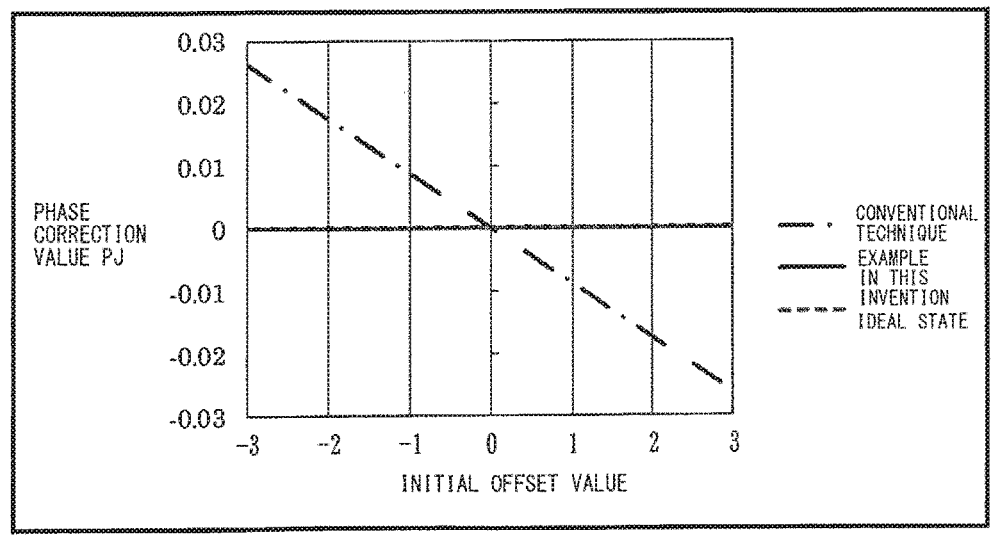
FIG. 4 is a graph showing another simulation result of the phase correction value.

FIG. 4 is a graph showing the phase correction values PJs, each of which is obtained in one correction operation computed while changing the initial offset value contained in the sine-wave signal under conditions that the initial offset value contained in the cosine-wave signal is fixed to 1.53% of the amplitude, that the amplitude ratio is fixed to 1, and that the phase angle error is fixed to 0 degrees. In FIG. 4, the horizontal axis represents ratios of the offset values to the amplitude, and the vertical axis represents the phase correction values. Further, in FIG. 4, the solid line indicates the phase correction values PJs obtained with the configuration of this example, the broken line indicates a desirable ideal phase correction value, and the dot and dash line indicates the phase correction values obtained with the conventional technique illustrated in FIG. 5. In the operation illustrated in FIG. 4, because the phase angle error is fixed as described above to 0 degrees, the ideal phase correction value is 0 degrees. However, it can be seen from FIG. 4 that in the conventional technique, deviations of the phase correction values from the ideal value (the broken line) become greater as the offset amounts are increased. On the other hand, it can be seen from FIG. 4 that in this example (the solid line), deviations of the phase correction values from the ideal value are dramatically reduced as compared with the conventional technique, and the phase correction value can be decreased almost to the ideal value (0 degrees).

As is evident from the above description, because the change in the phase correction value caused by the offset error and the amplitude ratio error and the change in the amplitude ratio correction value caused by the phase angle error can be corrected in this example, it is possible to improve accuracy in determination of various correction values and thus increase accuracy in interpolation from that achieved in the conventional technique.

REFERENCE SIGNS LIST 3, 4 amplifier; 5 timing controller; 6, 7 AD converter; 8, 9, 14, 38 subtractor; 15, 16, 39 multiplier; 17 interpolation calculator; 18 radius calculator; 19 fast Fourier calculator; 24, 25 position sensor; 30, 31, 32, 33 storage; 34, 35, 36, 37, 40, 41 calculator.

What is claimed is:
1. A position detector comprising:
position sensors;
amplifiers configured to receive the two signals outputted from the position sensors, the two signals sinusoidally changing at a pitch of a wavelength λ relative to a measured displacement and having phases that are shifted by 90 degrees from each other;
A/D converters configured to receive amplified signals from the amplifiers;
a storage configured to store offset correction values respectively used for correcting offset amounts contained in the two signals, a phase correction value used for correcting a phase difference between the two signals, and an amplitude ratio correction value used for correcting an amplitude ratio between the two signals;
an offset eliminator configured to eliminate each of the offset amounts from corresponding one of the two signals based on corresponding one of the offset correction values;
a phase error eliminator configured to eliminate a phase error component from one of the two signals based on the phase correction value;
an amplitude ratio error eliminator configured to eliminate an amplitude ratio error component from the one of the two signals based on the amplitude ratio correction value;
an interpolation calculator configured to convert, into position information, the two signals having been processed through elimination of the offset amounts, the phase error component, and the amplitude ratio error component;
a radius calculator configured to calculate a square root of the sum of squares of the two signals having been processed through elimination of the offset amounts, the phase error component, and the amplitude ratio error component, and output the calculated square root as a radius value;
a Fourier calculator configured to analyze a change in the radius value relative to the position information through Fourier analysis;
an offset correction value calculator configured to calculate, based on an analyzed result in the Fourier calculator, offset change values respectively representing amounts of change in the offset correction values, to find each next offset correction value based on both the corresponding one of the calculated offset change values and the corresponding one of present offset correction values;
a phase correction value calculator configured to calculate a phase change value representing an amount of change in the phase correction value, to find a next phase correction value based on both the calculated phase change value and a present phase correction value;
an amplitude ratio correction value calculator configured to calculate an amplitude ratio change value representing a ratio of change in the amplitude ratio correction value, to find a next amplitude ratio correction value based on both the calculated amplitude change value and a present amplitude ratio correction value, and
a virtual change value calculator configured to calculate, based on second-order components obtained through the Fourier analysis, both a virtual phase change value representing another amount of change in the phase correction value obtained when a change in each of the offset amounts and a change in the amplitude ratio are ignored, and a virtual amplitude ratio change value representing another ratio of change in the amplitude correction value obtained when a change in the phase difference is ignored, wherein;
the phase correction value calculator is configured to calculate the phase change value based on the offset change values, the radius value, the virtual phase change value, and the virtual amplitude ratio change value.

2. A position detector comprising:
position sensor;
amplifiers configured to receive the two signals outputted from the position sensors, the two signals sinusoidally changing at a pitch of a wavelength λ relative to a measured displacement and having phases that are shifted by 90 degrees from each other;
A/D converters configured to receive amplified signals from the amplifiers;
a storage configured to store offset correction values respectively used for correcting offset amounts contained in the two signals, a phase correction value used for correcting a phase difference between the two signals, and an amplitude ratio correction value used for correcting an amplitude ratio between the two signals;

an offset eliminator configured to eliminate each of the offset amounts from corresponding one of the two signals based on corresponding one of the offset correction values; a phase error eliminator that eliminates a phase error component from one of the two signals based on the phase correction value;

an amplitude ratio error eliminator configured to eliminate an amplitude ratio error component from the one of the two signals based on the amplitude ratio correction value;

an interpolation calculator configured to convert, into position information, the two signals having been processed through elimination of the offset amounts, the phase error component, and the amplitude ratio error component;

a radius calculator configured to calculate a square root of the sum of squares of the two signals having been processed through elimination of the offset amounts, the phase error component, and the amplitude ratio error component, and outputs the calculated square root as a radius value;

a Fourier calculator configured to analyze a change in the radius value relative to the position information through Fourier analysis;

an offset correction value calculator configured to calculate, based on an analyzed result in the Fourier calculator, offset change values respectively representing amounts of change in the offset correction values, to find each next offset correction value based on both the corresponding one of the calculated offset change values and the corresponding one of present offset correction values;

a phase correction value calculator configured to calculate a phase change value representing an amount of change in the phase correction value, to find a next phase correction value based on both the calculated phase change value and a present phase correction value, an amplitude ratio correction value calculator configured to calculate an amplitude ratio change value representing a ratio of change in the amplitude ratio correction value, to find a next amplitude ratio correction value based on both the calculated amplitude change value and a present amplitude ratio correction value, and a virtual change value calculator configured to calculate, based on second-order components obtained through the Fourier analysis and the radius value, both a virtual phase change value representing another amount of change in the phase correction value obtained when a change in each of the offset amounts and a change in the amplitude ratio are ignored, and a virtual amplitude ratio change value representing another ratio of change in the amplitude correction value obtained when a change in the phase difference is ignored, wherein;

the amplitude ratio correction value calculator is configured to calculate the amplitude ratio change value based on the virtual phase change value and the virtual amplitude ratio change value.

3. The position detector according to claim 1, wherein:

defining the offset change values of the two signals as COB and SOB, respectively, an average value of the radius values as RDA, the virtual phase change value as DP, the virtual amplitude ratio change value as DB, and the phase change value as PJB, the phase change value PJB is calculated by the following equation: $PJB = DP/DB + (COB \times SOB)/RDA$.

4. The position detector according to claim 2, wherein:

defining the virtual phase change value as DP, the virtual amplitude ratio change value as DB, an average value of the radius values as RDA, and the amplitude ratio change value as BJB, the amplitude ratio change value BJB is calculated by the following equation: $BJB = DP^2 + DB$.

* * * * *